United States Patent
Im

(10) Patent No.: US 12,503,156 B2
(45) Date of Patent: Dec. 23, 2025

(54) STEER-BY-WIRE SYSTEM CAPABLE OF CONTROLLING STEERING IN CASE OF BREAKDOWN OF STEERING FEEDBACK ACTUATOR AND METHOD OF CONTROLLING STEERING IN CASE OF BREAKDOWN OF STEERING FEEDBACK ACTUATOR

(71) Applicant: HL MANDO CORPORATION, Pyeongtaek (KR)

(72) Inventor: Cheonhyuk Im, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 457 days.

(21) Appl. No.: 18/297,940

(22) Filed: Apr. 10, 2023

(65) Prior Publication Data
US 2024/0101187 A1   Mar. 28, 2024

(30) Foreign Application Priority Data
Sep. 26, 2022   (KR) .................. 10-2022-0121424

(51) Int. Cl.
| | |
|---|---|
| *B62D 5/04* | (2006.01) |
| *B62D 3/12* | (2006.01) |
| *B62D 15/02* | (2006.01) |

(52) U.S. Cl.
CPC .............. *B62D 5/0484* (2013.01); *B62D 3/12* (2013.01); *B62D 15/025* (2013.01)

(58) Field of Classification Search
CPC ...... B62D 5/0484; B62D 3/12; B62D 15/025; B62D 5/003; B62D 6/00; B62D 15/00; B62D 5/006; B62D 6/008; B62D 15/024; B60Y 2306/13
See application file for complete search history.

(56) References Cited

U.S. PATENT DOCUMENTS

| | | | | |
|---|---|---|---|---|
| 2004/0262073 | A1* | 12/2004 | Husain ................... | B62D 1/163 180/443 |
| 2021/0253157 | A1* | 8/2021 | Hamori .................. | B62D 5/006 |
| 2024/0227932 | A1* | 7/2024 | Kakas .................. | B62D 5/0487 |

FOREIGN PATENT DOCUMENTS

CN          118871338 A   * 10/2024 ........... B62D 5/0487

\* cited by examiner

*Primary Examiner* — Karen Beck
(74) *Attorney, Agent, or Firm* — Harvest IP Law, LLP

(57) ABSTRACT

A steer-by-wire system according to the present disclosure includes a steering feedback actuator, a road wheel actuator, and a steering controller configured to receive a signal from the steering feedback actuator and output a control signal to the road wheel actuator, in which the steering controller controls the road wheel actuator by using information of a steering feedback actuator of another vehicle when the steering feedback actuator is broken down.

20 Claims, 5 Drawing Sheets

STEER-BY-WIRE SYSTEM CAPABLE OF CONTROLLING STEERING IN CASE OF BREAKDOWN OF STEERING FEEDBACK ACTUATOR AND METHOD OF CONTROLLING STEERING IN CASE OF BREAKDOWN OF STEERING FEEDBACK ACTUATOR

CROSS-REFERENCE TO RELATED APPLICATIONS

This application claims benefit and priority to Korean Patent Application No. 10-2022-0121424, filed on Sep. 26, 2022, with the Korean Intellectual Property Office, the disclosure of which is incorporated herein in its entirety by reference.

TECHNICAL FIELD

The present disclosure relates to a steer-by-wire system, and more particularly, to a steer-by-wire system capable of controlling steering in case of a breakdown of a steering feedback actuator (SFA) and a method of controlling steering in case of a breakdown of the SFA.

BACKGROUND

A power steering system refers to a system that provides a steering force to assist a driver in easily performing steering. Depending on operation methods, there are a hydraulic power steering (HPS) system that provides steering assistive power by generating hydraulic pressure by operating a pump, and an electric power steering (EPS) system that provides steering assistive power by operating a motor. Recently, the electric power steering system, which provides steering assistive power by operating the motor, has been often used.

The electric power steering systems may be classified into a mechanical power steering system and a steer-by-wire (SbW) system depending on whether a steering feedback actuator (SFA) and a road wheel actuator (RWA) are coupled by a mechanical connection member.

The mechanical power steering system means a power steering system in which the steering feedback actuator (SFA) and the road wheel actuator (RWA) are mechanically connected by means of the mechanical connection member. A rotational force (torque), which is generated when the driver rotates a steering wheel, is transmitted to a road wheel actuator through a mechanical power transmission device or a mechanical connection member (e.g., a linkage, a steering shaft, a universal joint, and the like), such that a tire wheel may be steered.

Meanwhile, instead of the mechanical power transmission device, there is a SbW system, a 4 WIS, or the like as a power steering system in which the steering feedback actuator (SFA) and the road wheel actuator (RWA) are electrically connected by means of a wire, a cable, or the like.

In the case of the SbW system, when the driver rotates the steering wheel, the steering feedback actuator (SFA) detects a steering angle of the steering wheel by using a steering angle sensor, calculates a steering control value related to the steering angle, and outputs an electrical signal related to the steering control value to the road wheel actuator (RWA), such that the road wheel actuator (RWA) steers the tire wheel.

In case of the power steering system, such as the SbW system, in which the steering feedback actuator (SFA) and the road wheel actuator (RWA) are electrically connected, no mechanical connection is provided between the steering wheel and the tire wheel. For this reason, there may occur a dangerous situation in which the steering cannot be performed by the steering wheel when the steering feedback actuator (SFA) is broken down.

FIG. 1 is a flowchart illustrating a steering control logic in case of a breakdown of the steering feedback actuator (SFA) in the SbW system in the related art.

As illustrated in FIG. 1, in case that the steering feedback actuator (SFA) is broken down in a state in which the road wheel actuator (RWA) normally steers a vehicle by receiving the signal from the steering feedback actuator (SFA), the road wheel actuator (RWA) steers the vehicle when the road wheel actuator (RWA) may operate. However, in case that the road wheel actuator (RWA) cannot operate, steering control is ended, which causes a dangerous state in which the steering cannot be performed.

SUMMARY

The present disclosure has been made in an effort to provide a steer-by-wire system and a steering control method, which are capable of controlling steering even in case of a breakdown of an SFA in an SbW system.

An exemplary embodiment of the present disclosure provides a steer-by-wire system including: a steering feedback actuator (SFA); a road wheel actuator (RWA); and a steering controller configured to receive a signal from the steering feedback actuator (SFA) and output a control signal to the road wheel actuator (RWA), in which the steering controller controls the road wheel actuator (RWA) by using information of a steering feedback actuator (SFA) of another vehicle when the steering feedback actuator (SFA) is broken down.

The steering feedback actuator (SFA) may include: a steering angle sensor configured to detect a steering angle of a steering wheel; a torque sensor configured to detect torque of the steering wheel; and a feedback motor configured to provide a reaction force to the steering wheel.

The steering controller may determine that the steering feedback actuator (SFA) is broken down when one of the steering angle sensor, the torque sensor, and the feedback motor of the steering feedback actuator (SFA) is abnormal.

The steer-by-wire system may further include: a receiver configured to receive information of the steering feedback actuator (SFA) of another vehicle.

The receiver may receive the information of the steering feedback actuator (SFA) of another vehicle through wireless communication.

The steering controller may output the control signal to the road wheel actuator (RWA) by using the information of the steering feedback actuator (SFA) of another vehicle received by the receiver.

The steer-by-wire system may further include: a transmitter configured to request the information of the steering feedback actuator (SFA) from another vehicle.

The information of the steering feedback actuator (SFA) of another vehicle positioned within a predetermined distance from a vehicle to which the steer-by-wire system is applied may be used.

The road wheel actuator (RWA) may include: a rack; and a steering motor configured to move the rack.

Another exemplary embodiment of the present disclosure provides a method of controlling steering in case of a breakdown of a steering feedback actuator in a steer-by-wire system, the method including: step S10 of determining a breakdown of a steering feedback actuator (SFA) in a steer-by-wire (SbW) system in which a road wheel actuator (RWA) steers a vehicle by receiving a signal from the steering feedback actuator (SFA); and step S20 of controlling the road wheel actuator (RWA) by using information of a steering feedback actuator (SFA) of another vehicle when the breakdown of the steering feedback actuator (SFA) is determined in step S10 and an operation of the road wheel actuator (RWA) is impossible because of the breakdown of the steering feedback actuator (SFA).

The steer-by-wire (SbW) system may include a steering controller configured to receive a signal from the steering feedback actuator (SFA) and output a control signal to the road wheel actuator (RWA).

Step S20 may further include step S21 of receiving the information of the steering feedback actuator (SFA) of another vehicle.

Step S20 may include outputting a control signal to the road wheel actuator (RWA) by using the information of the steering feedback actuator (SFA) of another vehicle received in step S21 by a steering controller configured to receive a signal from the steering feedback actuator (SFA) and output the control signal to the road wheel actuator (RWA).

Step S20 may further include step S22 of requesting the information of the steering feedback actuator (SFA) from another vehicle.

The present disclosure provides the steer-by-wire system and the steering control method, which are capable of controlling the steering even in case that the SFA is broken down.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
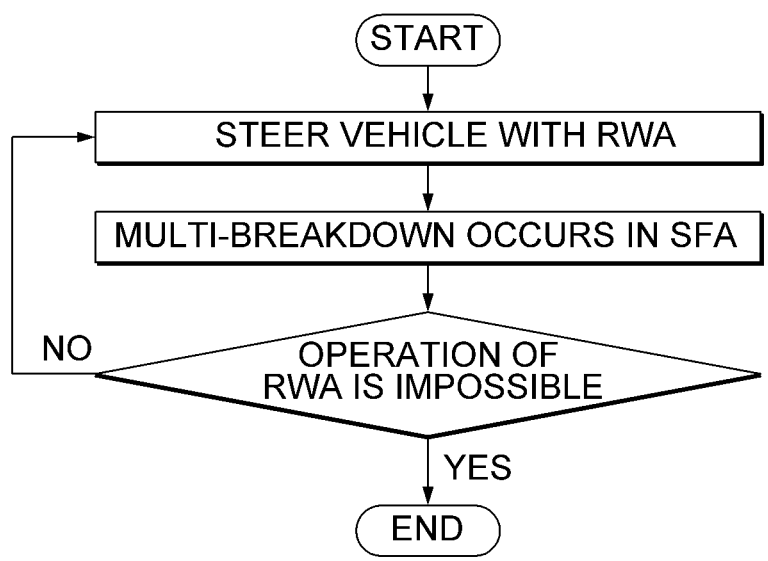
FIG. 1 is a flowchart illustrating a control process in case of a breakdown of an SFA in an SbW system in the related art.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art to which the present disclosure pertains can fully understand the scope of the present disclosure. the present disclosure will be defined only by the scope of the appended claims. Therefore, in some embodiments, well-known process steps, well-known element structures, and well-known technologies will not be specifically described to avoid ambiguous interpretations of the present disclosure. Throughout the specification, the same reference numerals denote the same constituent elements.

In order to clearly describe several layers and regions, thicknesses thereof are enlarged in the drawings. Throughout the specification, the same constituent elements are denoted by the same reference numerals. When one component such as a layer, a film, a region, or a plate is described as being positioned "on" another component, one component can be positioned "directly on" another component, and one component can also be positioned on another component with other components interposed therebetween. On the contrary, when one component is described as being positioned "directly above" another component, there is no component therebetween. In addition, when one component such as a layer, a film, a region, or a plate is described as being positioned "under" another component, one component can be positioned "directly under" another component, and one component can also be positioned on another component with other components interposed therebetween. On the contrary, when one component is described as being positioned "directly below" another component, there is no component therebetween.

Spatially relative terms, such as "below," "beneath," "lower," "above," "upper," and the like, may be used herein for ease of description of a correlation between one element or component and other elements or components, as illustrated in the drawings. It should be understood that the spatially relative terms encompass different orientations of the elements in use or operation in addition to the orientation depicted in the drawings. For example, if the element in the drawings is turned over, the element described as being "below" or "beneath" the other element may be placed "above" the other element. Thus, the exemplary term "below" can encompass both orientations of above and below. The elements may be oriented in different directions, and the spatially relative terms used herein may be interpreted in accordance with the orientations.

In the present specification, when one constituent element is referred to as being "connected to" another constituent element, one constituent element can be "directly connected to" the other constituent element, and one constituent element can also be connected to the other element with other elements therebetween. In addition, unless explicitly described to the contrary, the word "comprise/include" and variations such as "comprises/includes" or "comprising/including" will be understood to imply the inclusion of stated elements, not the exclusion of any other elements.

In the present specification, the terms such as "first," "second," "third," and other numerical terms may be used herein only to describe various elements, but these elements should not be limited by these terms. These terms are used only to distinguish one constituent element from another constituent element. For example, a first constituent element may be named a second or third constituent element, and similarly, the second or third constituent element may also be alternately named the first constituent element, without departing from the scope of the present disclosure.

Unless otherwise defined, all terms (including technical and scientific terms) used in the present specification may be used as the meaning which may be commonly understood by the person with ordinary skill in the art, to which the present disclosure belongs. In addition, terms defined in a generally used dictionary shall not be construed in ideal or excessively formal meanings unless they are clearly and specially defined in the present specification.

Hereinafter, a steer-by-wire system capable of controlling steering in case of a breakdown of an SFA in an SbW system and a method of controlling steering in case of a breakdown of the SFA in the SbW system according to the exemplary embodiment of the present disclosure will be described in detail with reference to the drawings.

Figure 2:
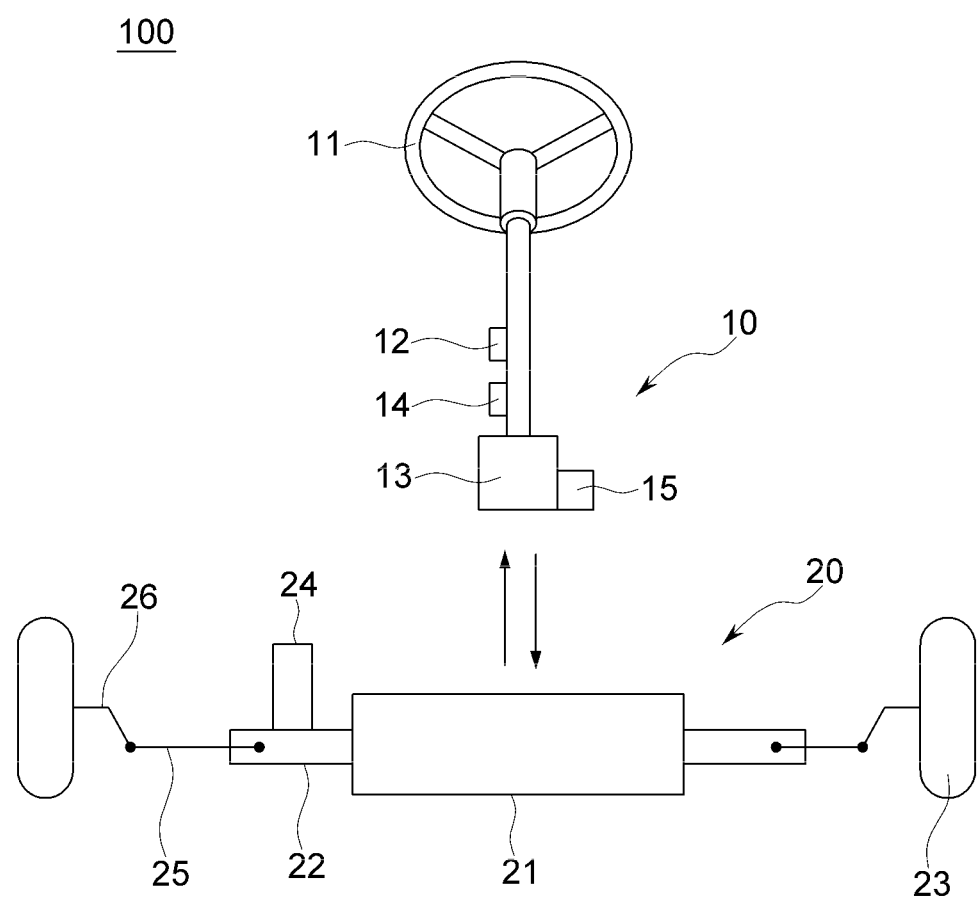
FIG. 2 is a view schematically illustrating an SbW system of the present disclosure.
Figure 3:
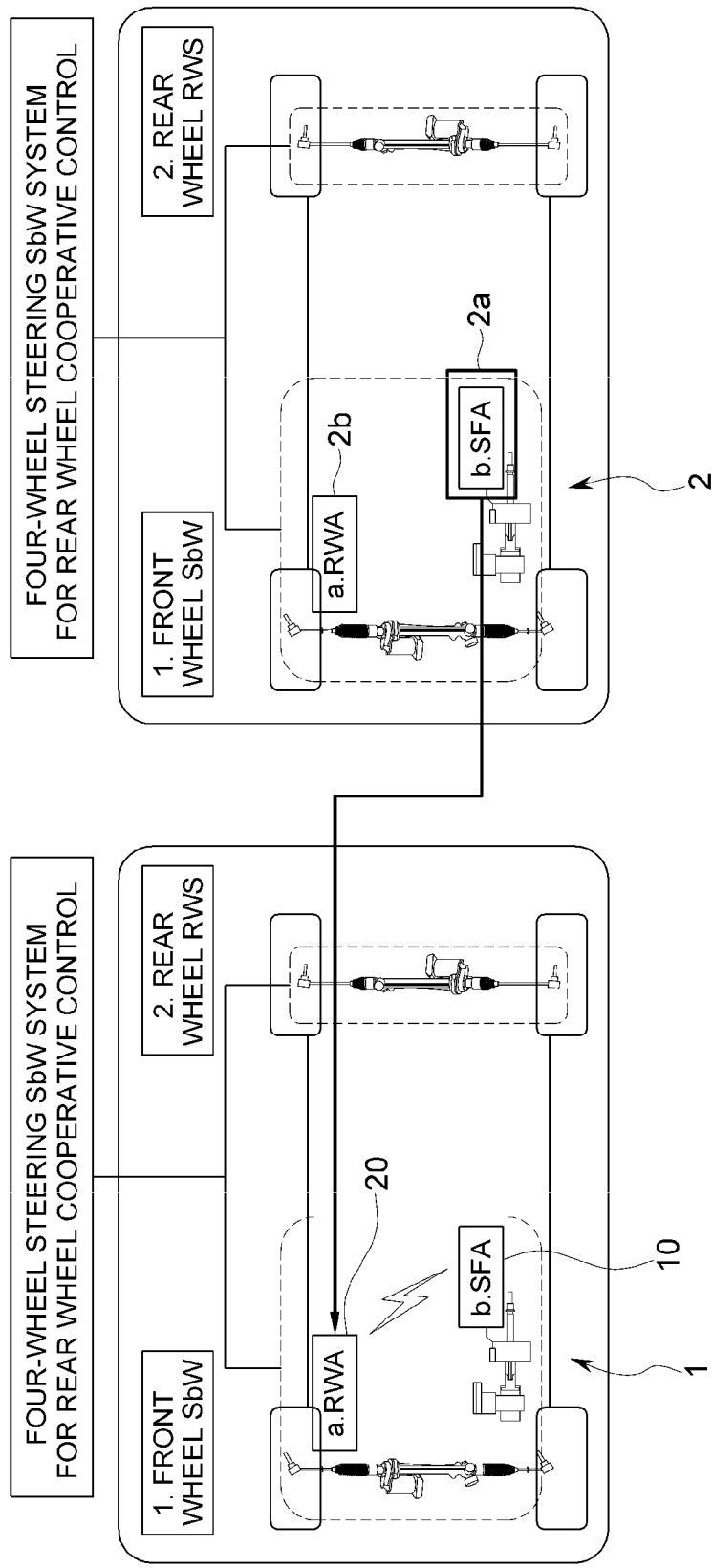
FIG. 3 is a view schematically illustrating a method of controlling steering in case of a breakdown of an SFA of the present disclosure.
Figure 4:
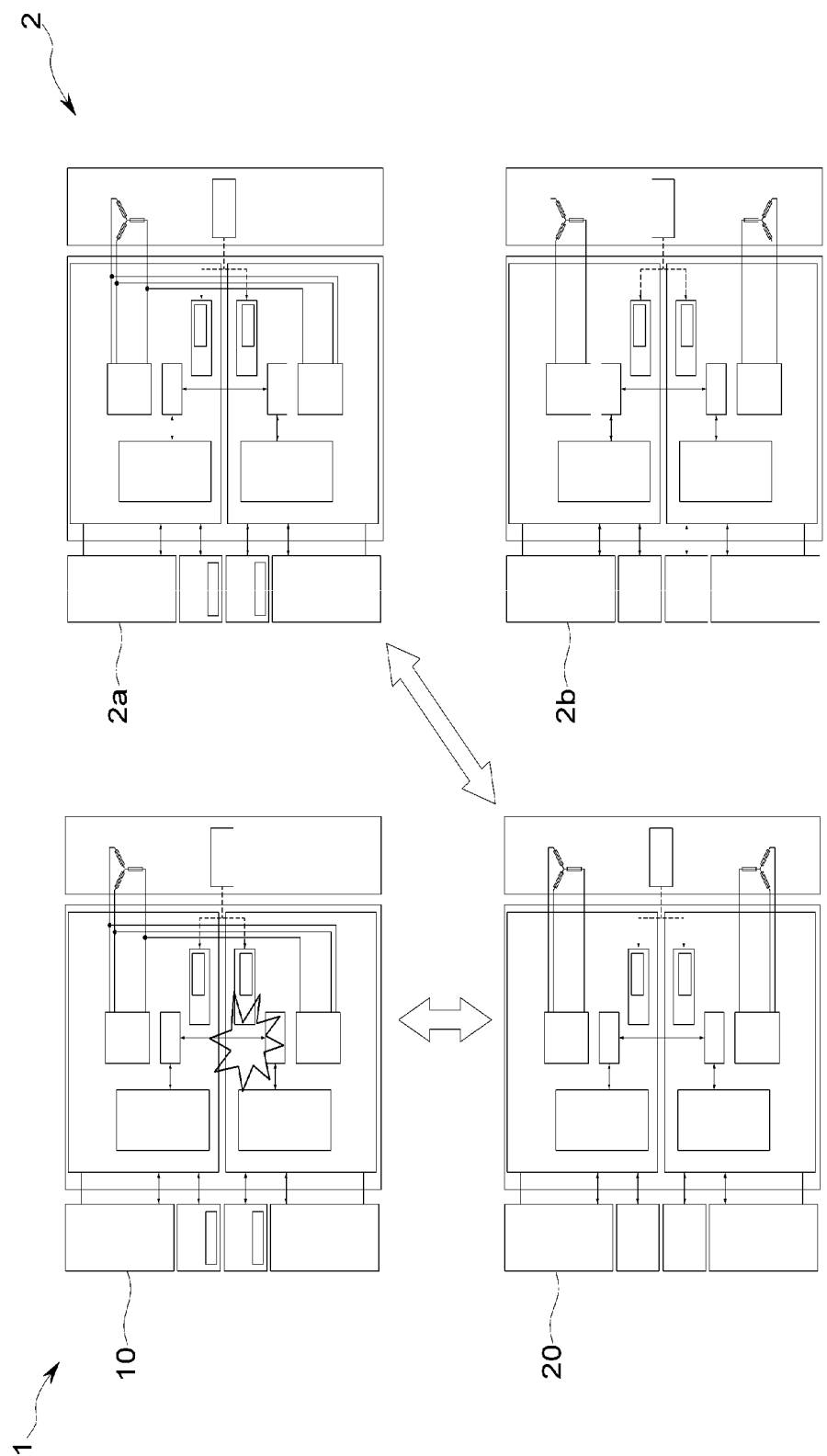
FIG. 4 is a view illustrating that an RWA is temporarily controlled by using information of another SFA in case of a breakdown of the SFA of the present disclosure.
Figure 5:
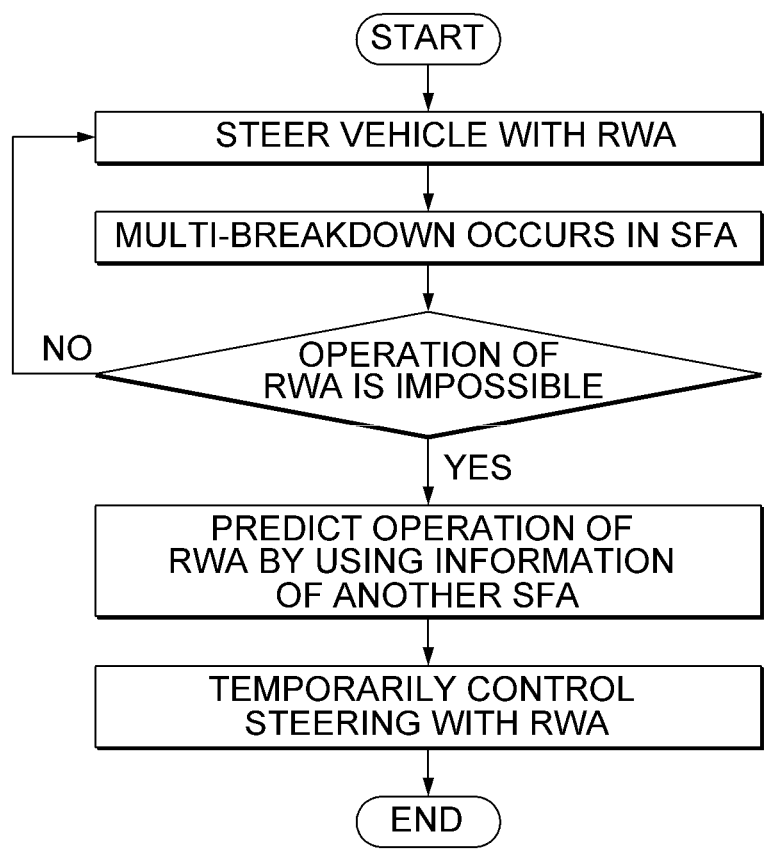
FIG. 5 is a flowchart illustrating a process of controlling steering in case of a breakdown of the SFA of the present disclosure.

FIG. 2 is a view schematically illustrating an SbW system of the present disclosure, FIG. 3 is a view schematically illustrating a method of controlling steering in case of a breakdown of an SFA of the present disclosure, FIG. 4 is a view illustrating that an RWA is temporarily controlled by using information of another SFA in case of a breakdown of the SFA of the present disclosure, and FIG. 5 is a flowchart illustrating a process of controlling steering in case of a breakdown of the SFA of the present disclosure.

First, an SbW system of the present disclosure will be schematically described with reference to FIG. 2.

A steer-by-wire (SbW) system 100 of the present disclosure includes a steering feedback actuator (SFA) 10 and a road wheel actuator (RWA) 20.

Although not illustrated, the steering feedback actuator (SFA) 10 and the road wheel actuator (RWA) 20 may be connected by an electrical connection member such as a wire, a cable, or the like.

The steering feedback actuator 10 may mean a device that receives steering information (e.g., a steering angle of a steering wheel) intended by a driver, generates a detection signal in response to the steering information, and outputs the detection signal to the road wheel actuator 20. The steering feedback actuator 10 may include a steering wheel 11, a steering angle sensor 12, a feedback motor 13, a torque sensor 14, and a steering controller 15.

The steering angle sensor 12 may detect a steering angle defined by a rotation of the steering wheel 11. Specifically, in case that the driver holds and rotates the steering wheel 11, the steering angle sensor 12 may detect a rotation angle (steering angle) of the steering wheel 11 and output a detection signal, which indicates the detected steering angle, to the steering controller 15.

The feedback motor 13 may receive signal information from the steering controller 15 and provide a reaction force to the steering wheel 11. Specifically, the feedback motor 13 may receive the signal information from the steering controller 15 and output reaction force torque by operating at a rotational speed in response to the signal information.

The torque sensor 14 may detect torque generated by the rotation of the steering wheel 11. Specifically, in case that the driver holds and rotates the steering wheel 11, the torque sensor 14 may detect the torque of the steering wheel 11 and output the detection signal to the steering controller 15.

The steering controller 15 is a device for controlling steering. Specifically, the steering controller 15 may calculate a steering control value by receiving the steering angle and the torque signal detected by the steering angle sensor 12 and the torque sensor 14 and output a control signal to the road wheel actuator 20.

The steering controller 15 may be implemented as an electronic control device such as an electronic controller unit (ECU) or a microcomputer. In addition, as illustrated, the steering controller 15 may be included in the steering feedback actuator 10. Alternatively, the steering controller 15 is provided as a separate device and disposed in a vehicle.

The road wheel actuator (RWA) 20 is a device that steers a vehicle wheel so that the vehicle is actually steered in accordance with the driver's intention. The road wheel actuator (RWA) 20 may include a steering motor 21, a rack 22, a rack position sensor 24, a tire wheel 23, and a vehicle speed sensor.

The steering motor 21 may move the rack 22 in an axial direction. Specifically, the steering motor 21 may operate by receiving the control signal related to the steering control value from the steering controller 15 and rectilinearly move the rack 22 in the axial direction. For example, the steering motor 21 may be a motor configured to rotate a pinion (not illustrated) that engages with the rack 22.

The rack 22 may be moved rectilinearly in a leftward/rightward direction by an operation of the steering motor 21. For example, the steering motor 21 rotates the pinion engaging with the rack 22, and the rack 22 may be rectilinearly moved in the leftward/rightward direction by the rotation of the pinion.

The rectilinear movement of the rack 22 may steer the two opposite tire wheels 23 leftward or rightward by means of knuckle arms 26 and tie rods 25 that connect the rack 22 and knuckles of the tire wheels 23.

The rack position sensor 24 may detect a position of the rack 22. Specifically, in case that the rack 22 rectilinearly moves from a position corresponding to a position at which the steering wheel 11 is at a neutral position, the rack position sensor 24 may detect an actual position of the rack 22 and output a detection signal, which is related to the detected position of the rack 22, to the steering controller 15.

In this case, the rack position sensor 24 may detect an actual movement speed of the rack 22. That is, the rack position sensor 24 may detect a position of the rack 22, calculate a movement speed of the rack 22 by obtaining a derivative of the detected position of the rack 22 with respect to the time, and output a signal, which is related to the movement speed of the rack 22, to the steering controller 15.

Meanwhile, in the present disclosure, the road wheel actuator 20 may further include an electronic control device such as an electronic controller unit (ECU) or a microcomputer. The road wheel actuator 20 including the electronic control device may receive a control signal from the steering controller 15, analyze effectiveness of the control signal, and output the control signal to the steering motor 21.

Although not illustrated, in the present disclosure, the SbW system 100 may further include a steering column, a pinion gear, a vehicle speed sensor configured to detect a traveling speed of the vehicle, a steering angle sensor configured to detect a steering angle of the tire wheel 23, a yaw rate sensor configured to detect a heading angle of the vehicle, and a clutch configured to separate or couple a steering input part and a steering output part.

A signal transmitting/receiving relationship between the steering controller 15 and the road wheel actuator 20 will be described. The steering controller 15 and the road wheel actuator 20 may be connected directly to each other by means of a communication bus to transmit and receive data, signals, and the like or connected to each other through a public communication bus in order to exchange data, signals, or the like with the components included in the SbW system 100. The public communication bus may mean vehicle communication means such as the steering feedback actuator 10 and the road wheel actuator 20. The components included in the SbW system 100 may exchange data, signals, and the like with one another through the public communication bus.

The public communication bus may be included in a cable, a wire, or the like. The public communication bus may be a bus used for communication means such as a controller area network (CAN), Ethernet, Flexray, and the like. However, the present disclosure is not limited thereto.

Because the steering feedback actuator (SFA) 10 and the road wheel actuator (RWA) 20 are not mechanically connected in the SbW system 100, there may occur a dangerous situation in which the steering cannot be performed by the steering wheel 11 in case that the steering feedback actuator 10 is broken down.

A method of controlling steering in case of a breakdown of the steering feedback actuator 10 according to the present disclosure will be described with reference to FIGS. 3 to 5.

As described above, in the SbW system 100, the control signal is transmitted from the steering feedback actuator (SFA) 10 to the road wheel actuator (RWA) 20 through the steering controller 15, such that the steering is performed. As described above, the steering controller 15 determines whether the steering feedback actuator (SFA) 10 is broken down in case that the steering feedback actuator (SFA) 10 is broken down in the state in which the vehicle 1 is normally steered by the road wheel actuator (RWA) 20.

The steering controller 15 determines that the steering feedback actuator (SFA) 10 is broken down when the steering controller 15 identifies abnormality of at least one of the feedback motor 13, the steering angle sensor 12, the torque sensor 14 and the like of the steering feedback actuator (SFA) 10.

In this case, as an example of the abnormality of the feedback motor 13, voltage at two opposite ends of the motor becomes 8.5 V or 0.2 V when a wire harness is short-circuited with a battery or the ground and an FET is short-circuited. That is, the breakdown is determined when voltage at two opposite ends of the feedback motor becomes 8.5 V or 0.2 V.

As an example of the abnormality of the steering angle sensor 12, electric current outputted from the sensor becomes larger than 80 mA or smaller than 4 mA when a connector is defectively connected or disconnected or the wire harness is short-circuited. That is, the breakdown may be determined when the electric current transmitted from the steering angle sensor 12 to the steering controller 15 becomes larger than 80 mA or smaller than 4 mA.

As an example of the abnormality of the torque sensor 14, electric current outputted from the sensor becomes larger than 9.4 mA or smaller than 0.6 mA when a connector is defectively connected or disconnected or the wire harness is short-circuited. That is, the breakdown may be determined when the electric current transmitted from the torque sensor 14 to the steering controller 15 becomes larger than 9.4 mA or smaller than 0.6 mA.

There may be lots of causes of the breakdown of the steering feedback actuator (SFA) 10 in addition to the abnormalities of the steering angle sensor 12, the feedback motor 13, and the torque sensor 14, and the cause of the breakdown is not limited to the above-mentioned examples.

As described above, the steering controller 15 determines that the steering feedback actuator (SFA) 10 is broken down when the steering controller 15 determines that at least one of the steering angle sensor 12, the feedback motor 13, the torque sensor 14 and the like is broken down.

The road wheel actuator (RWA) 20 is used to steer the vehicle even in case that the road wheel actuator (RWA) 20 may operate even though the steering feedback actuator (SFA) 10 is determined as being broken down.

In case that the steering feedback actuator (SFA) 10 is determined as being broken down and an operation of the road wheel actuator (RWA) 20 is impossible because of the breakdown of the steering feedback actuator (SFA) 10, an operation of the road wheel actuator (RWA) 20 is predicted by using information of a steering feedback actuator (SFA) 2a of another vehicle 2, and the steering of the vehicle 1 is temporarily controlled by the road wheel actuator (RWA) 20, as illustrated in FIGS. 3 and 4.

Like the steer-by-wire system (SbW) 100 of the vehicle 1 illustrated in FIG. 2, a steer-by-wire system of another vehicle 2 includes the steering feedback actuator (SFA) 2a and a road wheel actuator (RWA) 2b and steers the vehicle by means of the road wheel actuator (RWA) 2b by receiving a control signal from the steering feedback actuator (SFA) 2a.

The steering controller 15 may include a receiver (not illustrated) configured to receive information of the steering feedback actuator (SFA) 2a of another vehicle 2 in order to use information of the steering feedback actuator (SFA) 2a of another vehicle 2 in case that the operation of the road wheel actuator (RWA) 20 is impossible.

To receive information of the steering feedback actuator (SFA) 2a of another vehicle 2, the steering controller 15 may transmit an instruction to request information of the steering feedback actuator (SFA) 2a from another vehicle 2. To this end, the steering controller 15 may have a transmitter configured to transmit the instruction to request the information of the steering feedback actuator (SFA) 2a from another vehicle 2.

Specifically, because the vehicles, which are adjacent to each other, have similar traveling directions, the SbW system 100 may receive and use information of the steering feedback actuator (SFA) 2a of another vehicle 2 that travels and is adjacent to the vehicle of the SbW system 100. To this end, the steering controller 15 may transmit the instruction to request information of the steering feedback actuator (SFA) 2a from another vehicle 2 that travels within a predetermined distance from the vehicle 1. Therefore, the steering controller 15 may receive the information of the steering feedback actuator (SFA) 2a of another vehicle 2. For example, the steering controller 15 may receive information of the steering feedback actuator (SFA) 2a of another vehicle 2 positioned forward, rearward, leftward, or rightward of the vehicle 1.

The information on the steering feedback actuator (SFA) 2a of another vehicle 2 may be received through various types of wireless communication including wireless near-field communication (NFC) or the like, and another vehicle 2 may have a transmitter configured to transmit information of the steering feedback actuator (SFA) 10.

Therefore, the steering controller 15 receives the information of the steering feedback actuator (SFA) 2a of another vehicle 2 and temporarily control the steering of the vehicle by outputting the received information to the road wheel actuator (RWA) 20.

Meanwhile, as another example, the information of the steering feedback actuator (SFA) 10 of another vehicle may be received through a separate receiver (not illustrated), and the road wheel actuator (RWA) 20 may have a separate receiver configured to receive information of the steering feedback actuator (SFA) 10 of another vehicle 2.

Meanwhile, FIG. 3 illustrates that both the vehicle 1 and another vehicle 2 each have the four-wheel steering SbW system in which the road wheel actuators (RWA) 20 and 2b are disposed not only in the front wheel but also in the rear wheel. However, the road wheel actuator (RWA) 2b may be installed only in the front wheel or the rear wheel.

With the above-mentioned configuration of the present disclosure, it is possible to safely steer the vehicle by temporarily controlling the road wheel actuator (RWA) by using the information on the steering feedback actuator (SFA) of another vehicle even though the steering feedback actuator (SFA) 10 is broken down.

While the present disclosure has been described above with reference to the exemplary embodiments, the present disclosure is not limited thereto but may be variously modified by those skilled in the art without departing from the subject matter of the present disclosure disclosed in the appended claims.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A steer-by-wire system for a vehicle comprising:
   a steering feedback actuator;
   a road wheel actuator; and
   a steering controller configured to receive a signal from the steering feedback actuator and output a control signal to the road wheel actuator,
   wherein the steering controller controls the road wheel actuator by using information of a steering feedback actuator of another vehicle when the steering feedback actuator is broken down.

2. The steer-by-wire system of claim 1, wherein the steering feedback actuator comprises:
   a steering angle sensor configured to detect a steering angle of a steering wheel;
   a torque sensor configured to detect torque of the steering wheel; and
   a feedback motor configured to provide a reaction force to the steering wheel.

3. The steer-by-wire system of claim 2, wherein the steering controller determines that the steering feedback actuator is broken down when one of the steering angle sensor, the torque sensor, and the feedback motor of the steering feedback actuator is abnormal.

4. The steer-by-wire system of claim 1, further comprising:
   a receiver configured to receive information of the steering feedback actuator of another vehicle.

5. The steer-by-wire system of claim 4, wherein the receiver receives the information of the steering feedback actuator of another vehicle through wireless communication.

6. The steer-by-wire system of claim 4, wherein the steering controller outputs the control signal to the road wheel actuator by using the information of the steering feedback actuator of another vehicle received by the receiver.

7. The steer-by-wire system of claim 4, further comprising:
   a transmitter configured to request the information of the steering feedback actuator from another vehicle.

8. The steer-by-wire system of claim 1, wherein the information of the steering feedback actuator of another vehicle positioned within a predetermined distance from a vehicle to which the steer-by-wire system is applied is used.

9. The steer-by-wire system of claim 1, wherein the road wheel actuator comprises:
   a rack; and
   a steering motor configured to move the rack.

10. A method of controlling steering in case of a breakdown of a steering feedback actuator in a steer-by-wire system, the method comprising:
    step S10 of determining a breakdown of a steering feedback actuator in a steer-by-wire system in which a road wheel actuator steers a vehicle by receiving a signal from the steering feedback actuator; and
    step S20 of controlling the road wheel actuator by using information of a steering feedback actuator of another vehicle when the breakdown of the steering feedback actuator is determined in step S10 and an operation of the road wheel actuator is impossible because of the breakdown of the steering feedback actuator.

11. The method of claim 10, wherein the steering feedback actuator comprises:
    a steering angle sensor configured to detect a steering angle of a steering wheel;
    a torque sensor configured to detect torque of the steering wheel; and
    a feedback motor configured to provide a reaction force to the steering wheel.

12. The method of claim 11, wherein step S10 comprises determining that the steering feedback actuator is broken down when one of the steering angle sensor, the torque sensor, and the feedback motor of the steering feedback actuator is abnormal.

13. The method of claim 10, wherein the steer-by-wire system comprises a steering controller configured to receive a signal from the steering feedback actuator and output a control signal to the road wheel actuator.

14. The method of claim 10, wherein step S20 further comprises step S21 of receiving the information of the steering feedback actuator of another vehicle.

15. The method of claim 14, wherein the steer-by-wire system comprises a receiver configured to receive the information of the steering feedback actuator of another vehicle.

16. The method of claim 15, wherein the receiver receives the information of the steering feedback actuator of another vehicle through wireless communication.

17. The method of claim 14, wherein step S20 comprises outputting a control signal to the road wheel actuator by using the information of the steering feedback actuator of another vehicle received in step S21 by a steering controller configured to receive a signal from the steering feedback actuator and output the control signal to the road wheel actuator.

18. The method of claim 14, wherein step S20 further comprises step S22 of requesting the information of the steering feedback actuator from another vehicle.

19. The method of claim 10, wherein in step S20, the information of the steering feedback actuator of another vehicle positioned within a predetermined distance from the vehicle to which the steer-by-wire system is applied is used.

20. The method of claim 10, wherein the road wheel actuator comprises:
    a rack; and
    a steering motor configured to move the rack.

* * * * *